Patented Aug. 13, 1946

2,405,555

UNITED STATES PATENT OFFICE 2,405,555

MANUFACTURE OF HETEROCYCLIC BASES

Franz Bergel, Nathan Chadwick Hindley, Alexander Lang Morrison, and Heinrich Rinderknecht, Welwyn Garden City, England, assignors, by mesne assignments, to Hoffmann-La Roche Inc., Nutley, N. J., a corporation of New Jersey No Drawing. Application October 15, 1942, Serial No. 462,156. In Great Britain November 19, 1941

6 Claims. (Cl. 260—294)

It is known that arylacetonitrile derivatives react with alkyl halides in the presence of alkaline condensing agents such as sodium, sodamide, etc., to give alkyl derivatives. If there are two reactive hydrogen atoms present as in phenyl acetonitrile then mono- and dialkyl derivatives may be formed, while if there is only one reactive hydrogen present as in α-phenyl-α-carbethoxy acetonitrile then only the formation of a monoalkyl derivative is possible.

According to the present invention an amino alkyl halide of the following general formula:

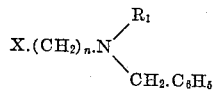

where X=halogen, $n=2$ or 3, and $R_1$=an alkyl or aryl group, is condensed in the presence of an alkaline condensing agent such as sodium or sodamide, with an arylacetonitrile derivative of the following general formula:

where $R_2$=an aryl group which may carry substituents not interfering with the reaction and $R_3$=H, an alkyl, an aryl or an esterified carboxyl group, to give compounds of the general formula:

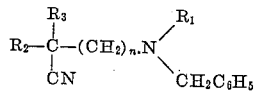

These compounds when submitted under acid conditions to a catalytic hydrogenation give pyrrolidine or piperidine bases on making the hydrogenated reaction mixture alkaline. This is brought about by removal of the benzyl groups during the hydrogenation in known manner, giving a secondary base, while at the same time the nitrile group is reduced to a primary amine; on making alkaline, ring closure takes place with elimination of ammonia. It follows that where $n=2$, a pyrrolidine derivative is formed, while where $n=3$, a piperidine derivative is the product.

The following examples illustrate how the process of the present invention may be carried into effect: The parts are by weight:

1. β-Chlorethyl methyl benzylamine was prepared in known manner by the action of thionyl chloride in chloroform solution on β-hydroxyethyl-methyl-benzylamine. It is a colourless oil of boiling point 121–123° C. at 10 mm. pressure.

To a well stirred suspension of 2.3 parts of sodamide in 25 parts of dry ether are added slowly 7 parts of phenylacetonitrile: the solution is then heated gently under reflux for 15 minutes. After cooling to 15° C., a solution of 10.5 parts β-chlorethyl-methyl-benzylamine in 40 parts of dry ether is added slowly with stirring and the stirring continued for a further 20 hours at 20° C. The reaction mixture is extracted with ice-cold water and the ether solution extracted with dilute hydrochloric acid. The latter on being made alkaline with caustic soda solution liberates the free base which is extracted with ether and on distillation yields the α-phenyl-γ-(methyl-benzylamino)butyro nitrile as an oil of boiling point 158–160° C. at 0.2 mm. pressure.

8.2 parts of this nitrile are dissolved in 50 parts of dry alcohol and shaken in a hydrogen atmosphere with 2 parts of a 12% palladium charcoal catalyst, sufficient dry alcoholic solution of HCl being added during the hydrogenation to maintain an acid condition. After the hydrogen absorption has ceased the reaction mixture is filtered free from catalyst and concentrated to dryness, the residue is dissolved in a little water, made alkaline and the precipitated base extracted with ether. On concentration of the dried ether solution and distillation of the residual oil 1-methyl-3-phenyl pyrrolidine is obtained with a boiling point 105–110° C. at 11 mm. pressure.

2. 0.43 part of sodium wire is added to a flask containing 50 parts of toluene, and 3.5 parts of phenyl-carbethoxy-acetonitrile (in the above general formula $R_2$=phenyl, $R_3$=carbethoxy) dissolved in 10 parts of toluene are gradually added with stirring. When all the sodium has reacted 3.5 parts of β-chloroethyl-methyl-benzylamine are added and the reaction mixture heated on a boiling water bath for 16 hours with continuous stirring. After cooling the reaction mixture is washed with water and the toluene solution extracted with dilute hydrochloric acid, from which the free base is liberated by addition of caustic soda. After extraction with ether, drying the ether solution, concentrating and distilling, the product which is the ethyl ester of α-phenyl-α-cyano-γ-(benzyl-methyl-amino) butyric acid, is obtained as an oil boiling at 195° C. at 0.1 mm.

2.4 parts of the above ester are dissolved in 30 parts alcohol, to which are added 10 parts of a 5% solution of palladium chloride in hydrochloric acid and 1 gm. of charcoal and the mixture then shaken in an atmosphere of hydrogen. After shaking for one hour a further 5 parts of the palladium chloride solution are added and shaking continued for a further 3 hours when the hydrogen absorption ceases. After removal of the charcoal and palladium by filtration the solution is concentrated to dryness by heating under reduced pressure, the residue dissolved in water, made alkaline with caustic soda solution and at once extracted with ether. The ether extract after drying and concentrating yields an oil which has a boiling point 114° C./0.4 mm. and is 1-methyl-3-phenyl-3-carbethoxy pyrrolidine. It gives a picrate of melting point 115–118° C.

3. γ-Chloro-propyl-methyl-benzylamine was prepared by condensing trimethylene chlorhydrin with methylbenzylamine in known manner to give γ-hydroxy propylmethyl-benzylamine, a liquid with a boiling point 147–149° C. at 11 mm., and treating the latter compound dissolved in chloroform with thionyl chloride. It is a colourless oil with a boiling point 131–133° C. at 11 mm.

To a well stirred suspension of 0.95 parts of sodium powder in 70 parts of dry toluene at 0° C., 7.5 parts of phenyl-carbethoxy acetonitrile are added slowly. Stirring is continued until all the sodium has reacted when 7.8 parts γ-chloropropyl-methyl-benzylamine dissolved in 40 parts dry toluene are slowly added and the reaction mixture then heated under reflux at 130° C. for 3 hours. After cooling, the reaction mixture is treated with water, and the basic portion of the toluene layer extracted with dilute hydrochloric acid, from which the base is liberated by addition of caustic soda solution and extracting with ether. After drying and concentrating the ether solution, the residue is distilled and gives the ethyl ester of α-phenyl-α-cyano-δ-(methyl benzylamino)-valeric acid, which has a boiling point 195–197° C. at 0.1 mm.

4.2 parts of the above ester is dissolved in alcohol and shaken in an atmosphere of hydrogen in the presence of a catalyst prepared by adding 0.2 part of platinum oxide, 2 parts of charcoal and 5 parts of a 5% aqueous solution of palladium chloride. As the hydrogenation proceeds a further 10 parts of the 5% palladium chloride solution is added in small portions to ensure slightly acid conditions throughout the reaction. When the hydrogen absorption has ceased, the solution is worked up exactly as described in Example 2, and yields 1-methyl-3-phenyl-3-carbethoxy piperidine as an oil with a boiling point 117–120° C. at 0.1 mm.

The hydrochloride of 1-methyl-3-phenyl-3-carbethoxy piperidine is a white crystalline solid with melting point 177–180° C.

4. γ-Chloropropyl-methyl-benzylamine can be prepared in an advantageous manner by condensing methylbenzylamine with 1:3-chlorobromopropane following the technique employed by Marxer (Helv. Chim. Acta, 1941, 24, 214) for the preparation of similar compounds. The product obtained by this procedure is a colourless oil with a boiling point 130–135° C. at 12 mm. and is identical with that obtained by a different route as described in the previous example.

The ethyl ester of o-tolyl-cyanacetic acid can be prepared by the action of ethyl carbonate on o-tolyl-acetonitrile using sodamide as the condensing agent essentially in the manner described by W. L. Nelson and L. H. Cretcher (J. A. C. S., 1928, 50, 2760) for the preparation of the ethyl ester of phenylcyanacetic acid. It is an oil boiling at 110–114° C./0.2 mm.

To 6.1 parts of o-tolyl-cyanacetic ethyl ester in 43.5 parts of dry toluene, 1.2 parts of powdered sodamide are added in several portions with mechanical stirring. The temperature of the reaction mixture is kept at 40–50° C. After the addition of the sodamide, the mixture is refluxed for 15 minutes. After cooling 6.0 parts of γ-chloro-propylmethyl-benzylamine are added slowly. The mixture is then refluxed for 3 hours. After cooling dilute hydrochloric acid is added with stirring, whereupon a heavy water-insoluble and toluene-insoluble oil separates. The toluene layer is separated and discarded. The insoluble oil and the hydrochloric acid extract are treated with solid sodium hydroxide with cooling. The resulting ethyl ester of α-(o-tolyl)-α-cyano-δ-(methyl-benzylamino)-valeric acid is extracted with ether. The extract is washed with water, dried and evaporated. The residue is distilled in high vacuo, when it comes over at 199–200° C./0.2 mm. as a slightly yellow oil.

6.6 parts of α-(o-tolyl)-α-cyano-δ-(methyl-benzylamino)-valeric acid ester are dissolved in alcohol and shaken in a hydrogen atmosphere in the presence of a catalyst prepared by adding 15 parts of a 5% palladium chloride solution to 6 parts of activated charcoal. The hydrogenation proceeds rapidly. When the rate of absorption decreases markedly another 5 parts of palladium chloride solution are added. When the hydrogenation is completed, the reaction mixture is worked up as described in Example 3, and yields 1-methyl-3-(o-tolyl)-3-carbethoxy-piperidine as an oil, boiling at 126–128° C./0.2 mm.

The hydrochloride of this base is a white crystalline powder melting at 200–201° C. The hydro-iodide is a solid melting at 178–180° C.

We claim:

1. A process for the manufacture of heterocyclic bases of the general formula:

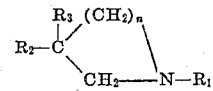

which comprises condensing an amino alkyl halide of the general formula:

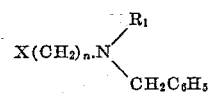

in the presence of an alkaline condensing agent with an arylacetonitrile derivative of the general formula:

where X is a halogen atom, n is an integer not less than 2 and not greater than 3, R₁ is a radical selected from the group consisting of alkyl and aryl groups, R₂ is an aryl group, and R₃ is selected from the group consisting of a hydrogen atom, and alkyl, aryl and esterified carboxyl radicals, to form a compound of the general formula:

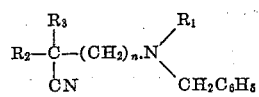

where n is an integer not less than 2 and not greater than 3, R₁ is a radical selected from the group consisting of alkyl and aryl groups, R₂ is an aryl group, and R₃ is selected from the group consisting of a hydrogen atom, and alkyl, aryl and esterified carboxyl radicals, hydrogenating said compound under acid conditions in the presence of a hydrogenation catalyst and making the hydrogenation mixture alkaline.

2. A process for the manufacture of heterocyclic bases of the general formula:

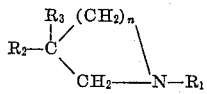

which comprises condensing an amino alkyl halide of the general formula:

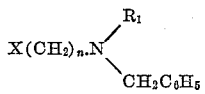

in the presence of an alkaline condensing agent with an arylacetonitrile derivative of the general formula:

where X is a halogen atom, $n$ is an integer not less than 2 and not greater than 3, $R_1$ is a radical selected from the group consisting of alkyl and aryl groups, $R_2$ is an aryl group, and $R_3$ is selected from the group consisting of a hydrogen atom, and alkyl, aryl and esterified carboxyl radicals, to form a compound of the general formula:

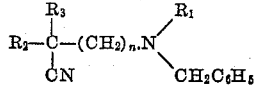

where $n$ is an integer not less than 2 and not greater than 3, $R_1$ is a radical selected from the group consisting of alkyl and aryl groups, $R_2$ is an aryl group, and $R_3$ is selected from the group consisting of a hydrogen atom, and alkyl, aryl and esterified carboxyl radicals, hydrogenating said compound under acid conditions in the presence of palladium and making the hydrogenation mixture alkaline.

3. As new chemical substances heterocyclic bases of the general formula:

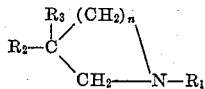

where $n$ is an integer not less than 2 and not greater than 3, $R_1$ is a radical selected from the group consisting of alkyl and aryl groups, $R_2$ is an aryl group, and $R_3$ is an esterified carboxyl radical.

4. As a new chemical substance, 1-methyl-3-phenyl-3-carbethoxy-pyrrolidine.

5. As a new chemical substance, 1-methyl-3-phenyl-3-carbethoxy-piperidine.

6. As a new chemical substance, 1-methyl-3-(o-tolyl)-3-carbethoxy-piperidine.

FRANZ BERGEL.
NATHAN CHADWICK HINDLEY.
ALEXANDER LANG MORRISON.
HEINRICH RINDERKNECHT.